(12) United States Patent
Oda et al.

(10) Patent No.: US 10,862,096 B2
(45) Date of Patent: Dec. 8, 2020

(54) LEAD MATERIAL FOR NEGATIVE ELECTRODE AND METHOD FOR MANUFACTURING LEAD MATERIAL FOR NEGATIVE ELECTRODE

(71) Applicant: HITACHI METALS, LTD., Tokyo (JP)

(72) Inventors: Yoshimitsu Oda, Suita (JP); Keita Watanabe, Suita (JP)

(73) Assignee: HITACHI METALS, LTD., Tokyo (JP)

( * ) Notice: Subject to any disclaimer, the term of this patent is extended or adjusted under 35 U.S.C. 154(b) by 73 days.

(21) Appl. No.: 16/470,336

(22) PCT Filed: Dec. 22, 2017

(86) PCT No.: PCT/JP2017/046128
§ 371 (c)(1),
(2) Date: Jun. 17, 2019

(87) PCT Pub. No.: WO2018/123865
PCT Pub. Date: Jul. 5, 2018

(65) Prior Publication Data
US 2020/0185688 A1 Jun. 11, 2020

(30) Foreign Application Priority Data
Dec. 27, 2016 (JP) .................................. 2016-252314

(51) Int. Cl.
*H01M 2/26* (2006.01)
*H01M 4/02* (2006.01)

(52) U.S. Cl.
CPC ........ *H01M 2/26* (2013.01); *H01M 2004/027* (2013.01)

(58) Field of Classification Search
CPC .......................... H01M 2/26; H01M 2004/027
See application file for complete search history.

(56) References Cited

U.S. PATENT DOCUMENTS

| | | | |
|---|---|---|---|
| 2014/0178755 A1 | 6/2014 | Oda et al. | |
| 2016/0308198 A1* | 10/2016 | Oda | B32B 15/01 |
| 2017/0077481 A1 | 3/2017 | Watanabe et al. | |

FOREIGN PATENT DOCUMENTS

| | | |
|---|---|---|
| JP | 2003-203622 A | 7/2003 |
| JP | 2004-63132 A | 2/2004 |
| JP | 2004-63133 A | 2/2004 |

(Continued)

OTHER PUBLICATIONS

International Search Report dated Feb. 13, 2018, issued in counterpart application No. PCT/JP2017/046128, w/English translation (5 pages).

(Continued)

*Primary Examiner* — Stewart A Fraser
(74) *Attorney, Agent, or Firm* — Westerman, Hattori, Daniels & Adrian, LLP

(57) ABSTRACT

A lead material (5) for a negative electrode is made of a clad material (50) including a Cu layer (51) made of Cu or a Cu alloy and Ni layers (52, 53) each made of Ni or a Ni alloy. The Ni layers are respectively bonded to opposite surfaces of the Cu layer. The Ni layers each include a surface (52b, 53b) not bonded to the Cu layer, the surface including an oxide film (52c, 53c) with a thickness of 30 nm or less.

8 Claims, 4 Drawing Sheets

(56) References Cited

FOREIGN PATENT DOCUMENTS

| JP | 2004-285371 A | 10/2004 |
| JP | 2006-287148 A | 10/2006 |
| JP | 2013-143314 A | 7/2013 |
| JP | 2017-54775 A | 3/2017 |
| WO | 2013/018841 A1 | 2/2013 |

OTHER PUBLICATIONS

Written Opinion dated Feb. 13, 2018, issued in counterpart application No. PCT/JP2017/046128 (7 pages).

Notice of Reasons for Refusal dated May 29, 2018, issued in counterpart Japanese Patent Application No. 2018-521134, w/English translation (12 pages).

Decision of Refusal dated Jul. 17, 2018, issued in counterpart Japanese Patent Application No. 2018-521134, w/English translation (9 pages).

Reconsideration Report by Examiner before Appeal dated Nov. 5, 2018, issued in counterpart Japanese Patent Application No. 2018-521134, w/English translation (7 pages).

* cited by examiner

LEAD MATERIAL FOR NEGATIVE ELECTRODE AND METHOD FOR MANUFACTURING LEAD MATERIAL FOR NEGATIVE ELECTRODE

TECHNICAL FIELD

The present invention relates to a lead material for a negative electrode and a method for manufacturing the lead material for a negative electrode.

BACKGROUND ART

In general, a lead material for a negative electrode that connects a negative electrode to a negative electrode terminal is known. Such a lead material for a negative electrode is disclosed in Japanese Patent Laid-Open No. 2003-203622, for example.

Japanese Patent Laid-Open No. 2003-203622 discloses a lead material for a negative electrode made of a clad material including a core material (Cu layer) that contains pure Cu or Cu as a main component and stacked materials (Ni layers) bonded to opposite surfaces of the core material and that contain pure Ni or Ni as a main component. When the lead material for a negative electrode disclosed in Japanese Patent Laid-Open No. 2003-203622 is produced, a rolling step and an annealing step are repeated on the lead material for a negative electrode similarly to a common lead material for a negative electrode such that the lead material for a negative electrode is conceivably thinned to a predetermined thickness.

PRIOR ART DOCUMENT

Patent Document

Patent Document 1: Japanese Patent Laid-Open No. 2003-203622

SUMMARY OF THE INVENTION

Problems to be Solved by the Invention

However, the present inventors have found a problem that in the lead material for a negative electrode described in Japanese Patent Laid-Open No. 2003-203622, the bonding strength tends to decrease when the lead material for a negative electrode is welded to the negative electrode or a negative electrode terminal.

The present invention has been proposed in order to solve the aforementioned problems, and an object of the present invention is to provide a lead material for a negative electrode and a method for manufacturing the lead material for a negative electrode in which a decrease in the bonding strength can be significantly reduced or prevented when the lead material for a negative electrode is welded to the negative electrode or a negative electrode terminal.

Means for Solving the Problems

As a result of earnest investigations in order to solve the aforementioned problems, the inventors of the present invention have found that in the lead material for a negative electrode described in Japanese Patent Laid-Open No. 2003-203622, an oxide film with a large thickness is formed on each of exposed surfaces of the stacked materials (Ni layers) when the clad material is annealed by heating in the atmosphere. Furthermore, the inventors have found that the bonding strength with the negative electrode or the negative electrode terminal is decreased due to the oxide film with a large thickness, and have conceived the present invention.

That is, a lead material for a negative electrode according to a first aspect of the present invention is made of a clad material including a Cu layer made of Cu or a Cu alloy and Ni layers each made of Ni or a Ni alloy, and the Ni layers are respectively bonded to opposite surfaces of the Cu layer, and the Ni layers each include a surface not bonded to the Cu layer, the surface including an oxide film with a thickness of 30 nm or less.

In the lead material for a negative electrode according to the first aspect of the present invention, as described above, exposed surfaces of the Ni layers of the clad material each include the oxide film with a thickness of 30 nm or less (preferably 10 nm or less) such that the thickness of the oxide film can be sufficiently reduced. Accordingly, when the lead material for a negative electrode is welded to a negative electrode or a negative electrode terminal by resistance welding and laser welding in which a lead material for a negative electrode and a negative electrode or a negative electrode terminal are melted and bonded (liquid phase bonded) to each other, or ultrasonic welding in which a negative electrode and a negative electrode or a negative electrode terminal are bonded (solid phase bonded) to each other without being melted, for example, the difficulty in direct contact of the Ni layer inside the oxide film of the lead material for a negative electrode with the negative electrode or the negative electrode terminal can be significantly reduced or prevented. Consequently, when the lead material for a negative electrode is welded to the negative electrode or the negative electrode terminal, a decrease in the bonding strength can be significantly reduced or prevented. When the lead material for a negative electrode is welded to the negative electrode by ultrasonic welding, for example, the oxide film wears due to friction between the lead material for a negative electrode and the negative electrode caused by ultrasonic vibration, and the thickness of the oxide film remaining on the surface can be reduced to an appropriate thickness (10 nm or less, for example) that does not affect welding. Thus, the required bonding strength with which the lead material for a negative electrode and the negative electrode are more preferably bonded to each other can be easily obtained. Consequently, insufficient welding of the lead material for a negative electrode to the negative electrode can be significantly reduced or prevented, and thus a decrease in the bonding strength between the lead material for a negative electrode and the negative electrode can be significantly reduced or prevented.

In the lead material for a negative electrode according to the first aspect, as described above, the Ni layers are respectively bonded to the opposite surfaces of the Cu layer, and the surface of each of the Ni layers not bonded to the Cu layer includes the oxide film with a thickness of 30 nm or less (preferably 10 nm or less). Accordingly, the surface of each of the Ni layers including the oxide film with a thickness of 30 nm or less (preferably 10 nm or less) is located on each of the front and back surfaces of the lead material for a negative electrode, and thus the negative electrode or the negative electrode terminal can be welded to any of the front and back surfaces of the lead material for a negative electrode while a decrease in the bonding strength due to welding is significantly reduced or prevented. Consequently, a surface of the lead material for a negative electrode welded to the negative electrode and a surface of the lead material for a negative electrode welded to the negative electrode terminal can be selected according to the positional relationship between the negative electrode and the negative electrode terminal in a battery. Therefore, the lead material for a negative electrode can be easily welded to the negative electrode and the negative electrode terminal.

In the aforementioned lead material for a negative electrode according to the first aspect, the clad material preferably has a bending stress of 500 MPa or less. According to this structure, the lead material for a negative electrode welded to the negative electrode or the negative electrode terminal can be easily bent and deformed in the battery, and thus the degree of freedom of arrangement of the lead material for a negative electrode can be improved. Consequently, the lead material for a negative electrode can be easily disposed in the battery.

In the aforementioned lead material for a negative electrode according to the first aspect, the Cu layer of the clad material preferably includes a surface (Cu exposed surface) to which the Ni layers are not bonded, the surface including a chemical conversion film that inhibits oxidation of the Cu layer. The Cu exposed surface corresponds to a cut surface of the cut clad material after the clad material is cut in a thickness direction. According to this structure, the Cu layer can be reliably and stably protected by the chemical conversion film formed by a chemical reaction with the Cu layer, and thus progress of the oxidation of the Cu layer can be reliably significantly reduced or prevented. When the lead material for a negative electrode is used in a lithium-ion battery, formation of copper oxide on the Cu exposed surface results in a reaction of O and Li generated due to reduction of the copper oxide in the battery and formation of lithium oxide with high resistance. In addition, Cu generated due to reduction of the copper oxide is deposited in the form of dendrites (dendritically). Consequently, both the formation of lithium oxide with high resistance and the deposition of Cu in the form of dendrites in the lithium-ion battery can be significantly reduced or prevented by the chemical conversion film formed on the Cu exposed surface.

A method for manufacturing a lead material for a negative electrode according to a second aspect of the present invention includes preparing a clad material in which Ni layers each made of Ni or a Ni alloy are respectively bonded to opposite surfaces of a Cu layer made of Cu or a Cu alloy by performing roll-bonding in a state in which Ni plates each made of the Ni or the Ni alloy are disposed on opposite surfaces of a Cu plate made of the Cu or the Cu alloy, and performing annealing in a non-oxidizing atmosphere on the clad material that has been prepared.

In the method for manufacturing a lead material for a negative electrode according to the second aspect of the present invention, in addition to the advantageous effects of the aforementioned lead material for a negative electrode according to the first aspect, the prepared clad material is annealed in the non-oxidizing atmosphere such that the thickness of the oxide film can be easily reduced to 30 nm or less on an exposed surface of each of the Ni layers, as compared with the case in which annealing is performed in the atmosphere, which is not the non-oxidizing atmosphere. In addition, the prepared clad material is annealed such that the stress (internal stress) of the clad material can be reduced, and thus the bending stress of the lead material for a negative electrode can be reduced. Thus, the lead material for a negative electrode can be easily bent and deformed. Therefore, the degree of freedom of arrangement of the lead material for a negative electrode can be improved.

In the aforementioned method for manufacturing a lead material for a negative electrode according to the second aspect, the annealing is preferably performed in the non-oxidizing atmosphere in an annealing furnace in which a dew-point temperature is set to −20° C. or less. According to this structure, the interior of the annealing furnace can be set such that the oxygen concentration is sufficiently reduced, and thus the thickness of the oxide film can be more reliably reduced to 30 nm or less (preferably 10 nm or less).

In the aforementioned method for manufacturing a lead material for a negative electrode according to the second aspect, the clad material can be cut in a thickness direction, and the annealing can be performed in the non-oxidizing atmosphere on the clad material that has been cut. When the clad material is cut, the clad material may be pressed in the vicinity of the cut surface, and work-hardening that exceeds the allowance may occur in the clad material. Therefore, in the present invention, the cut clad material is annealed in the non-oxidizing atmosphere such that the strain due to work-hardening caused by the cutting can be released, and thus the bending stress of the cut clad material can be reduced. Consequently, the lead material for a negative electrode cut into a predetermined size can be easily bent and disposed in a battery, and can be welded to the negative electrode or the negative electrode terminal.

The method for manufacturing a lead material for a negative electrode preferably further includes forming chemical conversion films that inhibit oxidation of the Cu layer on opposite end surfaces of the clad material in a width direction or on Cu exposed surfaces from which the Cu layer is exposed after the clad material is cut in the thickness direction, after the annealing. According to this structure, the chemical conversion films formed by a chemical reaction with the Cu layer are provided on surfaces of the Cu layer to which the Ni layers are not bonded or on the Cu exposed surfaces exposed by the cutting such that the Cu layer can be reliably and stably protected, and thus progress of the oxidation of the Cu layer can be reliably significantly reduced or prevented.

Effect of the Invention

According to the present invention, as described above, it is possible to provide the lead material for a negative electrode and the method for manufacturing the lead material for a negative electrode in which a decrease in the bonding strength can be significantly reduced or prevented when the lead material for a negative electrode is welded to the negative electrode or the negative electrode terminal.

MODES FOR CARRYING OUT THE INVENTION

An embodiment of the present invention is hereinafter described on the basis of the drawings.

A lead material 5 for a negative electrode according to the embodiment of the present invention is now described with reference to FIG. 1.

Figure 1:
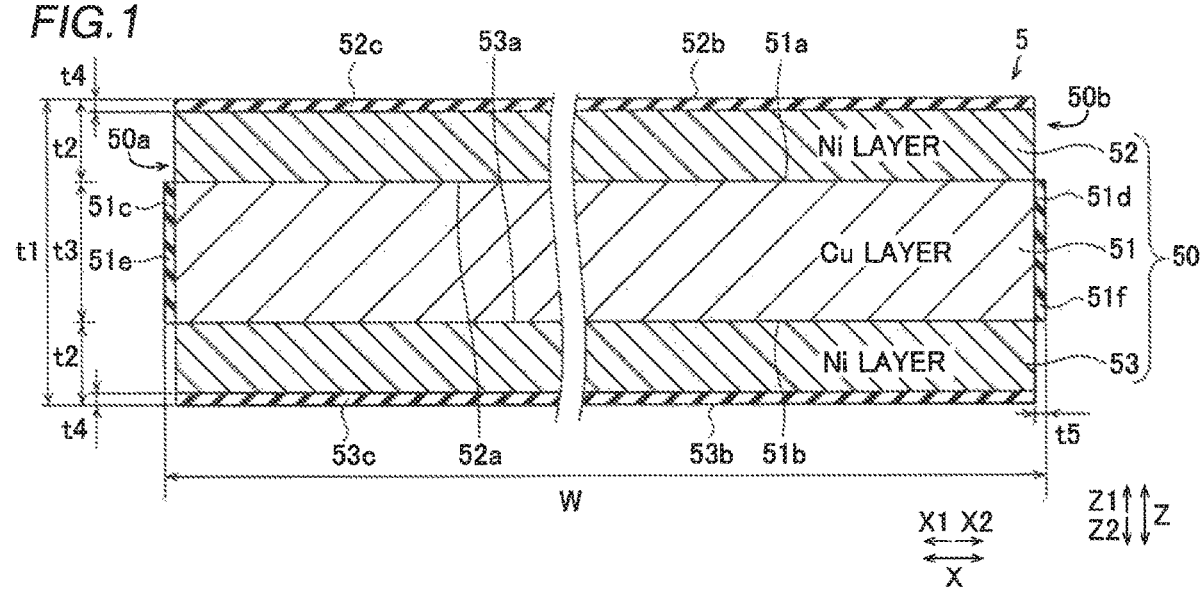
FIG. 1 A sectional view showing a lead material for a negative electrode according to an embodiment of the present invention.

(Structure of Lead Material for Negative Electrode) As shown in FIG. 1, the lead material 5 for a negative electrode includes three metal layers.

Specifically, the lead material 5 for a negative electrode is made of a clad material 50 having a three-layer structure including a Cu layer 51 and a pair of Ni layers 52 and 53 bonded to opposite surfaces of the Cu layer. In the clad material 50, the Ni layer 52, the Cu layer 51, and the Ni layer 53 are stacked in this order from the Z1 side toward the Z2 side.

A surface 52a of the Ni layer 52 on the Z2 side is bonded to a surface 51a of the Cu layer 51 on the Z1 side. At a bonding interface between the Cu layer 51 and the Ni layer 52, the metal atoms (mainly Cu) of the Cu layer 51 and the metal atoms (mainly Ni) of the Ni layer 52 approach each other due to clad rolling, and a strong attractive force acts thereon such that the metal atoms of the Cu layer 51 and the metal atoms of the Ni layer 52 are metallurgically bonded to each other. Furthermore, a surface 53a of the Ni layer 53 on the Z1 side is bonded to a surface 51b of the Cu layer 51 on the Z2 side. At a bonding interface between the Cu layer 51 and the Ni layer 53, the metal atoms (mainly Cu) of the Cu layer 51 and the metal atoms (mainly Ni) of the Ni layer 53 are metallurgically bonded to each other, similarly to the bonding interface between the Cu layer 51 and the Ni layer 52.

The thickness t1 of the clad material 50 in a Z direction is about 0.1 mm. The thickness t2 of the Cu layer 51 in the Z direction is about 50 µm, and the thicknesses t3 of the Ni layers 52 and 53 are both about 25 µm. The values of the thicknesses t1 to t3 are examples, and the thicknesses of the clad material 50, the Cu layer 51, and the Ni layers 52 and 53 are not limited to the values of the thicknesses t1 to t3.

The Cu layer 51 is made of a metal material mainly containing Cu, which contains 99.0 mass % or more of Cu. For example, the Cu layer 51 is made of oxygen-free copper containing 99.96 mass % or more of Cu, phosphorus-deoxidized copper containing 99.75 mass % or more of Cu, or tough pitch copper containing 99.9 mass % or more of Cu.

Furthermore, the surface 51a of the Cu layer 51 on the Z1 side and the surface 51b of the Cu layer 51 on the Z2 side are respectively covered with the Ni layers 52 and 53, and thus formation of an oxide film on each of the surfaces 51a and 51b of the Cu layer 51 can be significantly reduced or prevented.

The pair of Ni layers 52 and 53 are each made of a metal material mainly containing Ni, which contains 99.0 mass % or more of Ni. For example, the pair of Ni layers 52 and 53 are made of NW2200 or NW2201 defined in JIS-H4551. In addition, the pair of Ni layers 52 and 53 may be made of the aforementioned metal materials having the same composition, or may be made of the aforementioned metal materials having different compositions.

In the present embodiment, a surface 52b of the Ni layer 52 on the Z1 side not bonded to the Cu layer 51 is exposed on the Z1 side of the clad material 50. Similarly, a surface 53b of the Ni layer 53 on the Z2 side not bonded to the Cu layer 51 is exposed on the Z2 side of the clad material 50. The surface 52b of the Ni layer 52 includes an oxide film 52c having a thickness t4 of 30 nm or less. That is, a nickel oxide film (oxide film 52c) is formed in a range of 30 nm or less in a Z2 direction from the outermost surface of the Ni layer 52 on the Z1 side. Similarly, the surface 53b of the Ni layer 53 includes an oxide film 53c having a thickness of 30 nm or less. That is, a nickel oxide film (oxide film 53c) is formed in a range of 30 nm or less in a Z1 direction from the outermost surface of the Ni layer 53 on the Z2 side.

Both the oxide film 52c on the surface 52b and the oxide film 53c on the surface 53b are oxide films formed without depending on positive oxidation treatment after annealing in a non-oxidizing atmosphere. That is, the oxide film 52c on the surface 52b and the oxide film 53c on the surface 53b are neither oxide films (thermal oxide films) formed by thermal oxidation due to exposure to high temperature under the atmosphere nor oxide films (anode oxide films) formed by anodizing treatment. The oxide film 52c on the surface 52b and the oxide film 53c on the surface 53b are formed by oxidation of the exposed surface 52b of the Ni layer 52 and the exposed surface 53b of the Ni layer 53 at normal temperature and under the atmosphere (under normal environment) without depending on positive oxidation treatment. In the case of thermal oxide films and anode oxide films, it is not easy to stably and practically control an oxidation reaction so as to form oxide films each having a thickness of 30 nm or less, unlike the oxide films formed without depending on positive oxidation treatment, and thus the thicknesses of the oxide films tend to be much larger than 30 nm.

The thickness t4 of the oxide film 52c on the surface 52b and the thickness t4 of the oxide film 53c on the surface 53b may be equal to or larger than the thickness of an oxide film formed naturally. In the case of a surface of a Ni material containing about 99.7 mass % of Ni placed under normal environment, the oxygen value in the vicinity of the outermost surface obtained by glow-discharge optical emission spectrometry (GD-OES) analysis is about 15%, and the depth value before the oxygen value becomes 10% or less is about 0.5 nm. When such a Ni material is heated, the oxygen value in the vicinity of the outermost surface of the Ni material tends to increase, but variation of the value increases due to the influence of surface morphology such as surface roughness. Therefore, the thickness of the oxide film formed naturally on the surface of the Ni layer of the clad material is estimated to be about 0.5 nm to about 1.5 nm in consideration of measurement accuracy and variations. With the oxide films 52c and 53c each having such a thickness, it is easy to significantly reduce or prevent further progress of oxidation on the surfaces 52b and 53b. On the surfaces 52b and 53b, even when the thicknesses t4 of the oxide films 52c and 53c are about 0.5 nm to about 1.5 nm at a certain point, oxidation conceivably slightly proceeds from that point under normal environment. Therefore, the thicknesses t4 of the oxide films 52c and 53c may be larger than about 0.5 nm to about 1.5 nm. However, on the surfaces 52b and 53b, oxidation does not proceed to such an extent that the thicknesses t4 of the oxide films exceed 30 nm under normal environment. Therefore, even when the thicknesses t4 of the oxide films 52c and 53c increase under normal environment, the thicknesses t4 are conceivably about 1.5 nm or more and 30 nm or less.

When the lead material 5 for a negative electrode is welded to a negative electrode 3b and a negative electrode terminal (housing 1), the thicknesses t4 of the oxide film 52c on the surface 52b and the oxide film 53c on the surface 53b are preferably as small as possible, about 20 nm or less, more preferably about 15 nm or less, and still more preferably about 10 nm or less. Furthermore, the thicknesses t4 are even more preferably about 8 nm or less, and further more preferably about 6 nm or less. Thus, when the lead material 5 for a negative electrode is welded to the negative electrode 3b and the negative electrode terminal (housing 1), the lead material 5 for a negative electrode becomes less influenced by the oxide film remaining on the surface 52b or 53b as the thickness of the oxide film decreases. Thus, it is possible to further significantly reduce or prevent the possibility of resulting in insufficient bonding strength.

On a side surface 50a of the clad material 50 on one side (X1 side) in the width direction (X direction), a side surface 51c of the Cu layer 51 is not covered with the Ni layers 52 and 53 and is exposed. Similarly, on a side surface 50b of the clad material 50 on the other side (X2 side) in the width direction, a side surface 51d of the Cu layer 51 is not covered with the Ni layers 52 and 53 and is exposed. Furthermore, the side surfaces 50a and 50b of the clad material 50 are cut surfaces formed by cutting the clad material 50 at the time of producing the lead material 5 for a negative electrode described below.

In the present embodiment, the side surfaces 51c and 51d respectively include chemical conversion films 51e and 51f. Both the chemical conversion films 51e and 51f are formed by a chemical reaction with Cu, which is a main component of the Cu layer 51. Specifically, the chemical conversion films 51e and 51f are multiple chemical conversion films containing benzotriazole copper salt and copper oxide (Cu$_2$O). The chemical conversion films 51e and 51f are formed by a chemical reaction of Cu of the side surfaces 51c and 51d with benzotriazole as a rust inhibitor.

The thicknesses t5 of the chemical conversion films 51e and 51f are preferably about 1 nm or more, more preferably about 3 nm or more, and still more preferably about 5 nm or more. The thicknesses t5 of the chemical conversion films 51e and 51f are preferably about 500 nm or less, more preferably about 300 nm or less, and still more preferably about 200 nm or less.

In the present embodiment, the bending stress of the clad material 50 is 550 MPa or less. The bending stress of the clad material 50 is preferably 500 MPa or less, and more preferably 450 MPa or less.

In FIG. 1, the oxide films 52c and 53c and the chemical conversion films 51e and 51f are illustrated in an exaggerated manner for easy understanding. Similarly, in FIG. 3 and FIG. 4 described below, the oxide film 52c (53c) and the chemical conversion films 51e and 51f are illustrated in an exaggerated manner.

<Structure of Battery>

A battery 100 using the lead material 5 for a negative electrode according to the embodiment of the present invention is now described with reference to FIGS. 1 to 4.

Figure 2:
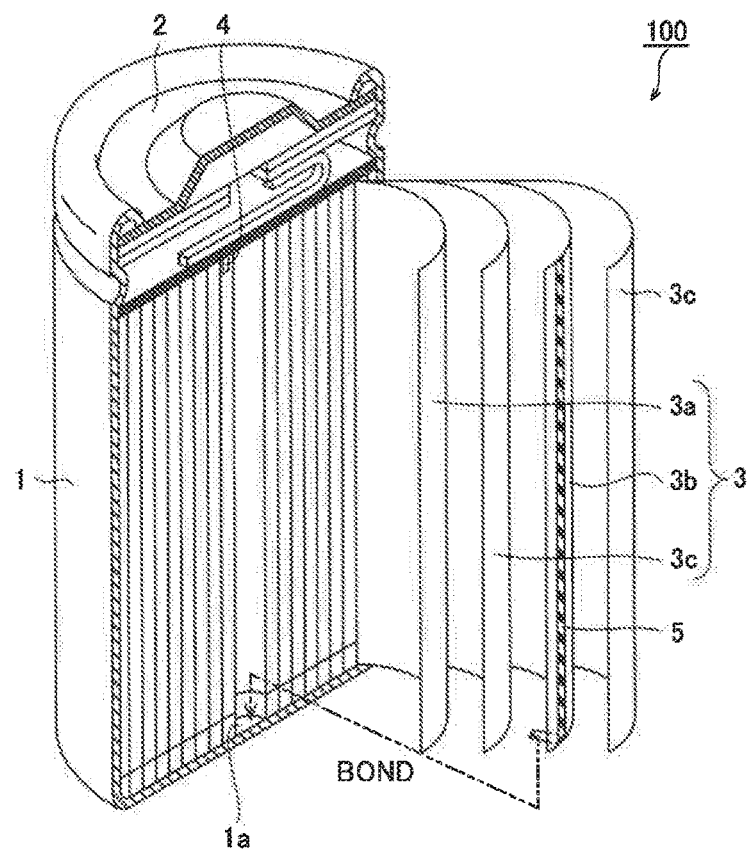
FIG. 2 A schematic sectional view showing a battery using the lead material for a negative electrode according to the embodiment of the present invention.

The battery 100 is a so-called cylindrical lithium-ion battery, as shown in FIG. 2. The battery 100 includes the cylindrical housing 1, a lid 2 that seals an opening of the housing 1, and a power generation element 3 disposed in the housing 1. The housing 1 is made of a Ni-plated steel plate and doubles as a negative electrode terminal of the battery 100.

In the housing 1, the power generation element 3 and an electrolyte (not shown) are housed. The lid 2 is made of an aluminum alloy or the like, and doubles as a positive electrode terminal of the battery 100. The power generation element 3 is formed by winding a positive electrode 3a, the negative electrode 3b, and an insulating separator 3c disposed between the positive electrode 3a and the negative electrode 3b. The positive electrode 3a is made of an aluminum foil coated with a positive electrode active material (not shown) such as lithium manganate. The negative electrode 3b is made of a copper foil coated with a negative electrode active material (not shown) such as carbon.

The battery 100 further includes a lead material 4 for a positive electrode that connects the positive electrode 3a to the positive electrode terminal (lid 2), and the aforementioned lead material 5 for a negative electrode (a thickly hatched portion in FIG. 2) that connects the negative electrode 3b to the negative electrode terminal (housing 1). The lead material 4 for a positive electrode is bonded to the positive electrode 3a and the lid 2 by resistance welding or the like. The lead material 4 for a positive electrode is made of a flat aluminum foil.

Figure 3:
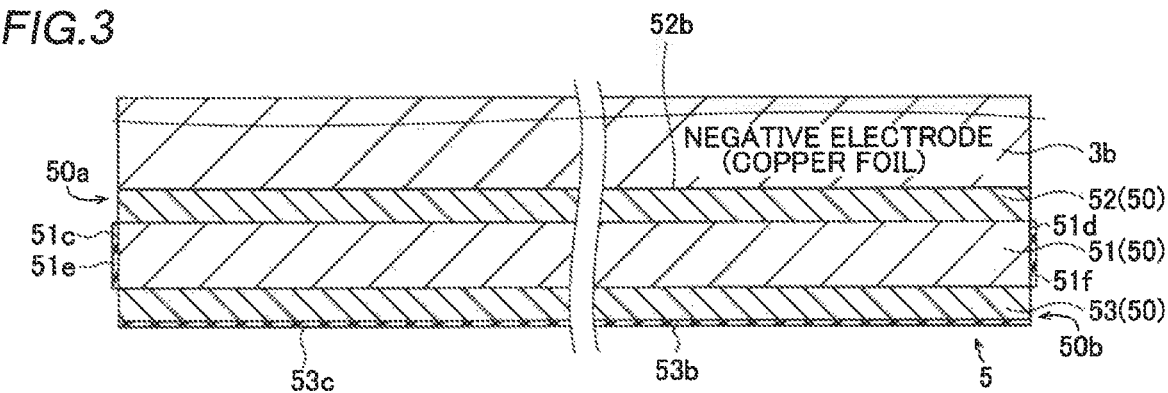
FIG. 3 A sectional view illustrating a state in which the lead material for a negative electrode and the negative electrode are welded in the battery using the lead material for a negative electrode according to the embodiment of the present invention.

The lead material 5 for a negative electrode is welded (bonded) by ultrasonic welding from the vicinity of one end of the negative electrode 3b to the other end thereof along the longitudinal direction of the housing 1. The lead material 5 for a negative electrode is welded to a portion of the negative electrode 3b onto which the negative electrode active material is not applied and from which the copper foil is exposed. As shown in FIG. 3, the oxide film 52c (see FIG. 1) on the surface 52b of the Ni layer 52 is substantially removed by vibration at the time of ultrasonic welding.

Figure 4:
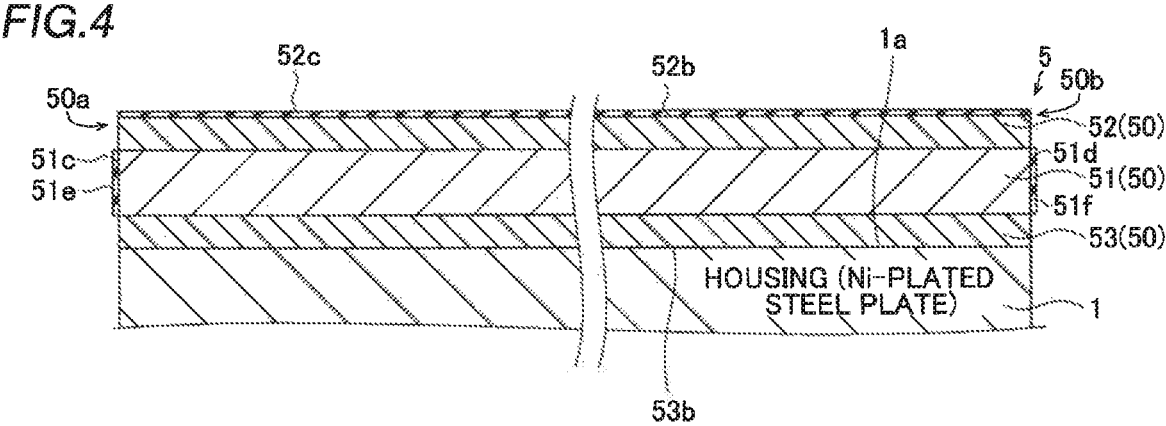
FIG. 4 A sectional view illustrating a state in which the lead material for a negative electrode and a negative electrode terminal (housing) are welded in the battery using the lead material for a negative electrode according to the embodiment of the present invention.

The lead material 5 for a negative electrode is welded (bonded) to the inner bottom surface 1a of the housing 1 by resistance welding. As shown in FIG. 4, the oxide film 53c (see FIG. 1) on the surface 53b of the Ni layer 53 is substantially removed by resistance welding.

<Method for Manufacturing Lead Material for Negative Electrode>

A method for manufacturing the lead material 5 for a negative electrode according to the embodiment of the present invention is now described with reference to FIGS. 1 and 5 to 8.

(Method for Manufacturing Clad Material)

First, a method for manufacturing the clad material 50 used as a material of the lead material 5 for a negative electrode according to the embodiment of the present invention is described with reference to FIGS. 1 and 5.

Figure 5:
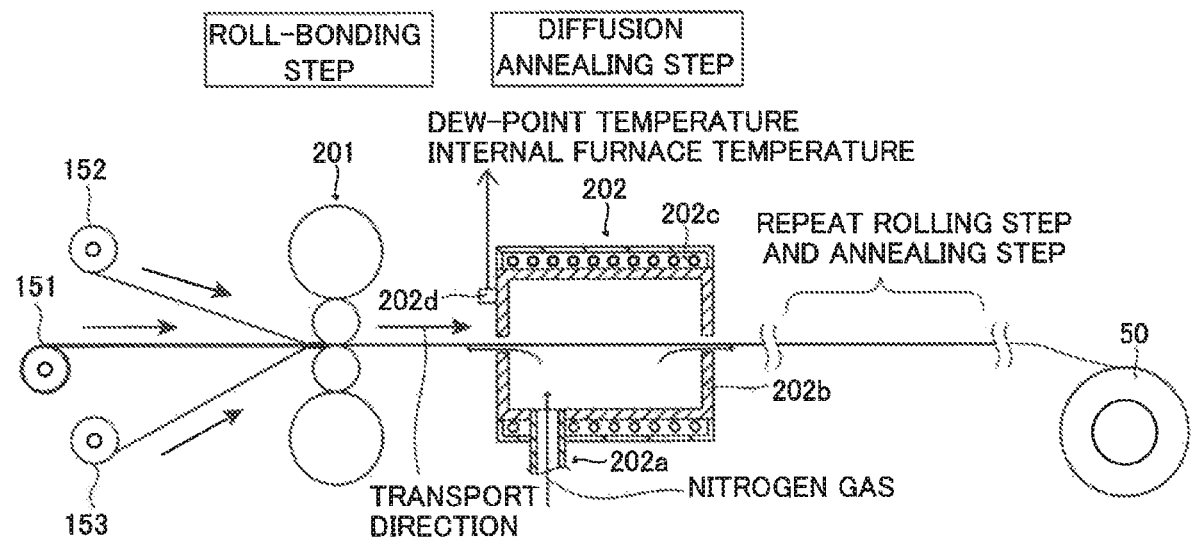
FIG. 5 A schematic view illustrating steps up to production of a rolled clad material in a manufacturing process of the lead material for a negative electrode according to the embodiment of the present invention.

First, as shown in FIG. 5, a rolled Cu plate 151 containing 99.0 mass % or more of Cu and a pair of rolled Ni plates 152 and 153 containing 99.0 mass % or more of Ni are prepared. The Cu plate 151 and the Ni plates 152 and 153 have a thickness ratio substantially equal to the thickness ratio of the Cu layer 51 and the Ni layers 52 and 53 (see FIG. 1) in the clad material 50 to be produced.

Then, in a state in which the Ni plates 152 and 153 are respectively disposed on opposite surfaces of the Cu plate 151, a roll-bonding step of rolling by a roller 201 is performed so as to obtain a predetermined rolling reduction (about 60%, for example). Thus, the clad material 50 (see FIG. 1) is obtained in which the Ni layer 52, the Cu layer 51, and the Ni layer 53 are stacked in this order and bonded. This roll-bonding step is performed cold.

Thereafter, a diffusion annealing step of diffusion-annealing the bonded Cu plate 151 and Ni plates 152 and 153 in a non-oxidizing atmosphere is performed. Specifically, the bonded Cu plate 151 and Ni plates 152 and 153 are passed through an annealing furnace 202 and are diffusion-annealed in a non-oxidizing atmosphere. The annealing furnace 202 includes a furnace main body 202b including a gas injection portion 202a, a heater 202c that surrounds the furnace main body 202b, and raises and maintains the temperature inside the furnace main body 202b, and a detector 202d that detects the dew-point temperature and the internal furnace temperature inside the furnace main body 202b. In the annealing furnace 202, the internal furnace temperature inside the furnace main body 202b is maintained at about 800° C. by the heater 202c, and the dew-point temperature inside the furnace main body 202b is adjusted to −20° C. or less by a nitrogen gas introduced from the gas injection portion 202a.

In the annealing furnace 202, a nitrogen gas is continuously introduced into the furnace main body 202b such that air in the furnace main body 202b is discharged to the outside. Thus, the amount of water in the furnace main body 202b decreases, the dew-point temperature decreases, and the oxygen concentration decreases.

Then, the bonded Cu plate 151 and Ni plates 152 and 153 are held for about 1 minute in the annealing furnace 202 in which the interior of the furnace main body 202b is set to a non-oxidizing atmosphere. Thus, the metal atoms (mainly Cu) of the Cu plate 151 and the metal atoms (mainly Ni) of the Ni plates 152 and 153 diffuse at an interface between the Cu plate 151 and the Ni plate 152 and an interface between the Cu plate 151 and the Ni plate 153. Consequently, diffusion bonding is performed at the interface between the Cu plate 151 and the Ni plate 152 and the interface between the Cu plate 151 and the Ni plate 153.

In this diffusion annealing step, the stress (internal stress) that has been increased in the roll-bonding step is released, and thus the bending stress of the Cu plate 151 and the Ni plates 152 and 153 is reduced. Furthermore, in the diffusion annealing step, formation of oxide films each having a thickness of more than 30 nm on the exposed surfaces of the Ni plates 152 and 153 is prevented unlike an annealing step in the atmosphere.

After that, a rolling step is performed on the bonded Cu plate 151 and Ni plates 152 and 153 in the same manner as the aforementioned rolling step so as to obtain a predetermined rolling reduction. Then, an annealing step in a non-oxidizing atmosphere is performed on the bonded Cu plate 151 and Ni plates 152 and 153 in the same manner as the aforementioned diffusion annealing step. The rolling step and the annealing step are repeated until the thickness of the bonded Cu plate 151 and Ni plates 152 and 153 becomes a desired thickness. At this time, in the annealing step, the Cu plate 151 and the Ni plates 152 and 153 prevent formation of oxide films each having a thickness of more than 30 nm, similarly to the diffusion annealing step. Thus, a strip-like clad material 50 (see FIG. 1) including the Cu layer 51 and the pair of Ni layers 52 and 53 bonded to the opposite surfaces of the Cu layer 51 is produced. Then, the produced strip-like clad material 50 is wound into a roll.

The width (the length in a direction perpendicular to a transport direction) of the produced clad material 50 is at least more than eight times the width W (see FIG. 1) of the lead material 5 for a negative electrode. Therefore, at least eight strip-like lead materials 5 for a negative electrode can be produced from the produced strip-like clad material 50.

The method for producing the clad material 50 described above is continuously performed. That is, the roll-bonding step, the diffusion annealing step, the rolling step, and the annealing step are continuously performed on the rolled (strip-like) Cu plate 151 and Ni plates 152 and 153 to produce the rolled (strip-like) clad material 50.

(Method for Manufacturing Lead Material for Negative Electrode)

Next, a method for producing the lead material 5 for a negative electrode according to the present embodiment from the aforementioned strip-like clad material 50 is described with reference to FIG. 1 and FIGS. 6 to 8.

Figure 6:
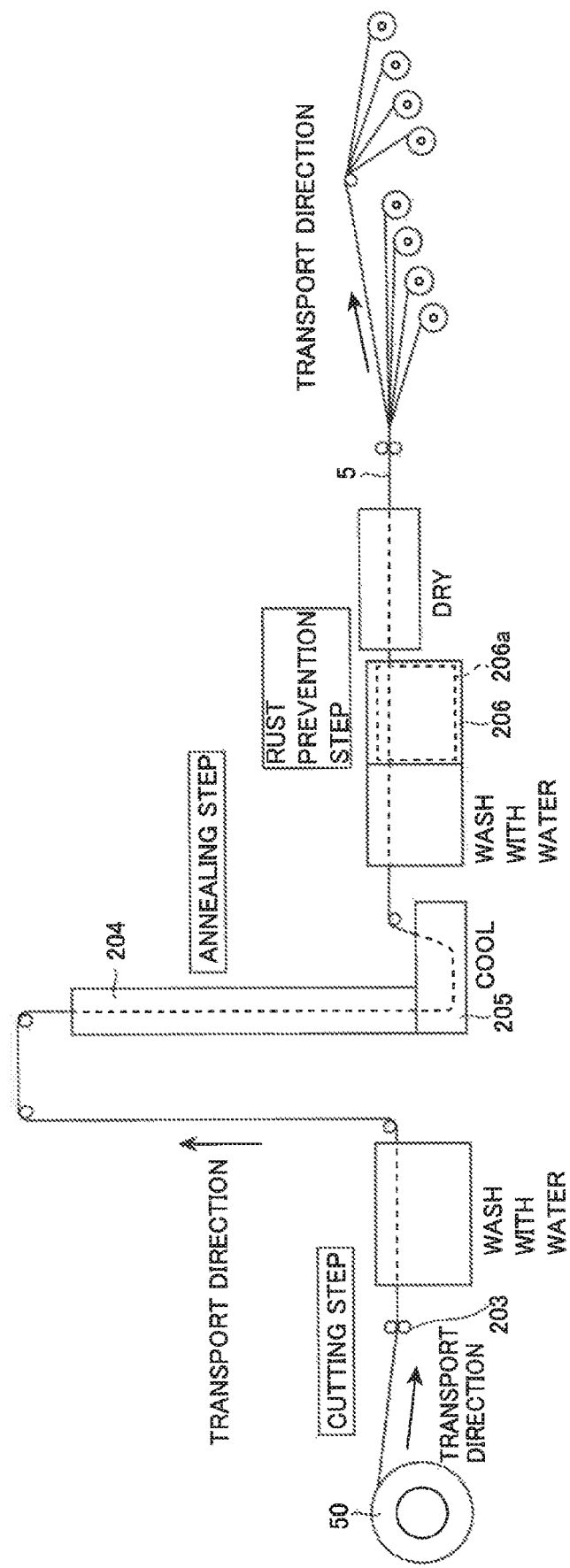
FIG. 6 A schematic view illustrating steps up to production of a rolled lead material for a negative electrode from the rolled clad material in the manufacturing process of the lead material for a negative electrode according to the embodiment of the present invention.
Figure 7:
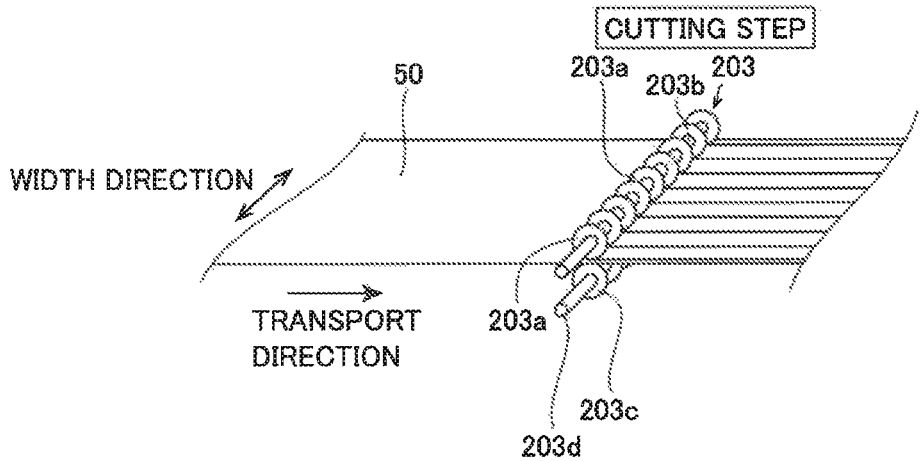
FIG. 7 A schematic perspective view illustrating a step of cutting the rolled clad material in a width direction in the manufacturing process of the lead material for a negative electrode according to the embodiment of the present invention.

First, as shown in FIG. 6, the rolled (strip-like) clad material 50 produced by the aforementioned method for manufacturing the clad material 50 is prepared. Then, a cutting step of cutting the strip-like clad material 50 in a slit shape with a slitter 203 is performed. As shown in FIG. 7, the slitter 203 is rotatable, and includes a slit cutter 203b in which nine circular cutters 203a are disposed at regular intervals in the width direction and a slit cutter 203d that faces the slit cutter 203b and in which nine circular cutters 203c are disposed at regular intervals in the width direction. The strip-like clad material 50 is sandwiched between the circular cutters 203a and 203c such that the strip-like clad material 50 is cut in a slit shape in a thickness direction. Thus, at least eight strip-like clad materials 50 are produced.

In the cutting step, the clad material 50 is pressed in the vicinity of both the side surfaces 50a and 50b (see FIG. 1) of the strip-like clad material 50 in the width direction, and thus the rigidity of the cut strip-like clad material 50 is increased. Furthermore, the side surfaces 51c and 51d (see FIG. 1) of the Cu layer 51 are exposed on both the side surfaces 50a and 50b (cut surfaces) of the strip-like clad material 50, respectively.

Figure 8:
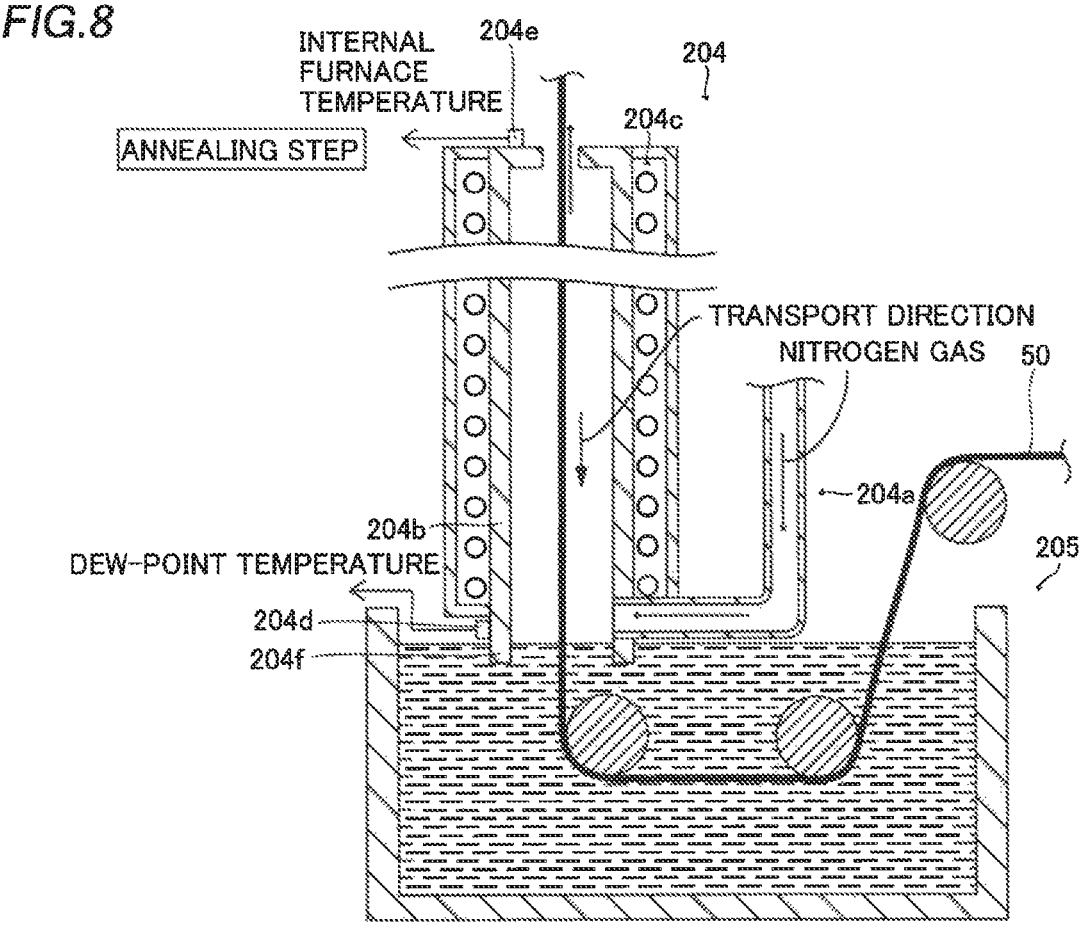
FIG. 8 A schematic sectional view illustrating a step of annealing the cut clad material in a non-oxidizing atmosphere in the manufacturing process of the lead material for a negative electrode according to the embodiment of the present invention.

Thereafter, as shown in FIG. 6, the cut clad material 50 is washed with water such that foreign matter such as cut pieces attached at the time of cutting is removed. Then, the cut clad material 50 is passed through an annealing furnace 204 such that an annealing step in a non-oxidizing atmosphere is performed. This annealing step has the similar configuration to the annealing furnace 202 used at the time of producing the clad material 50. That is, as shown in FIG. 8, the annealing furnace 204 includes a furnace main body 204b including a gas injection portion 204a, a heater 204c that raises and maintains the temperature inside the furnace main body 204b, a dew-point temperature detector 204d that detects the dew-point temperature inside the furnace main body 204b, and an internal furnace temperature detector 204e that detects the internal furnace temperature inside the furnace main body 204b. In the annealing furnace 204, the internal furnace temperature inside the furnace main body 204b is maintained at about 800° C. by the heater 204c, and the dew-point temperature inside the furnace main body 204b is adjusted to −20° C. or less by a nitrogen gas introduced from the gas injection portion 204a.

Then, the cut clad material 50 is held for about 1 minute in the annealing furnace 204 in which the interior of the furnace main body 204b is set to a non-oxidizing atmosphere. Thus, the strain due to work-hardening caused by the cutting is released, and thus the bending stress of the clad material 50 is reduced. Furthermore, in this annealing step, formation of oxide films each having a thickness of more than 30 nm on the exposed surfaces (the surface 52b of the Ni layer 52 and the surface 53b of the Ni layer 53) of the clad material 50 is prevented unlike the annealing step in the atmosphere. In addition, formation of oxide films on the exposed side surfaces 51c and 51d of the Cu layer 51 is significantly reduced or prevented.

A lower portion 204f of the annealing furnace 204 is connected to a cooling tank 205 in which water for cooling is stored. Thus, the cut clad material 50 that passes through the annealing furnace 204 is directly cooled in the cooling tank 205 without being exposed to air outside the annealing furnace 204. Thus, formation of oxide films each having a thickness of more than 30 nm on the surface 52b of the Ni layer 52 and the surface 53b of the Ni layer 53 is more reliably prevented. Note that the dew-point temperature detector 204d is disposed above the water for cooling in the cooling tank 205 and in the vicinity of the lower portion 204f.

In addition, the annealing step is performed such that the bending stress of the cut clad material 50 is reduced to 500 MPa or less.

As shown in FIG. 6, after the clad material 50 cooled in the cooling tank 205 is washed with water, a rust prevention step of applying rust-proofing to the exposed portions (the side surfaces 51c and 51d) of the Cu layer is performed. In the rust prevention step, the clad material 50 is dipped in a processing tank 206 in which an aqueous solution 206a of benzotriazole, which is a rust inhibitor, is stored. At this time, benzotriazole chemically reacts with Cu located on the side surfaces 51c and 51d. Thus, the chemical conversion films 51e and 51f are formed with predetermined thicknesses on the side surfaces 51c and 51d, respectively. The chemical conversion films 51e and 51f include multiple chemical conversion films containing benzotriazole copper salt and copper oxide ($Cu_2O$).

On the other hand, Ni and benzotriazole hardly chemically react with each other, and thus chemical conversion films are not formed on the surface 52b of the Ni layer 52 and the surface 53b of the Ni layer 53, for example, other than the side surfaces 51c and 51d.

Finally, the clad material 50 on which the chemical conversion films 51e and 51f are formed is dried, and then the clad material 50 is wound into a roll such that the strip-like lead material 5 for a negative electrode is produced.

The method for producing the aforementioned lead material 5 for a negative electrode is continuously performed. That is, the cutting step, the annealing step, and the rust prevention step are continuously performed on the rolled (strip-like) clad material 50 such that the rolled (strip-like) lead material 5 for a negative electrode is produced.

<Method for Manufacturing Battery>

A method for manufacturing the battery using the lead material 5 for a negative electrode according to the embodiment of the present invention is now described with reference to FIGS. 1 to 4.

First, the cylindrical housing 1, the lid 2, and the power generation element 3 (see FIG. 2) are prepared. Then, the negative electrode 3b of the power generation element 3 is connected to the negative electrode terminal (housing 1) by the lead material 5 for a negative electrode.

Specifically, as shown in FIG. 3, the negative electrode 3b of the power generation element 3 and the lead material 5 for a negative electrode are welded (bonded) to each other by ultrasonic welding. In such a case, the copper foil and the lead material 5 for a negative electrode are sandwiched between an ultrasonic terminal (horn) and a pedestal of an ultrasonic welder (not shown) in a state in which the portion of the negative electrode 3b from which the copper foil is exposed and the surface 52b of the Ni layer 52 of the lead material 5 for a negative electrode are in contact with each other. Then, an ultrasonic wave is applied to the lead material 5 for a negative electrode and the copper foil from the ultrasonic terminal such that the Ni layer 52 and the copper foil wear due to vibration. Thus, the oxide film 52c (see FIG. 1) having a thickness of 30 nm or less and formed on the surface 52b of the Ni layer 52 of the lead material 5 for a negative electrode is substantially removed. Furthermore, the oxide film 52c is substantially removed such that the Ni layer 52 inside the oxide film 52c and the surface of the copper foil come close to each other, frictional heat generated by ultrasonic vibration is efficiently conducted, and diffusion occurs at an interface between the Ni layer 52 and the copper foil. At this time, Ni has a lower thermal conductivity than Cu, and thus quick dissipation (escape) of the frictional heat in a plate surface direction from the welding position of the lead material 5 for a negative electrode is significantly reduced or prevented, and the frictional heat is efficiently supplied to a welded portion. Thus, the lead material 5 for a negative electrode and the negative electrode 3b are welded to each other with sufficient bonding strength.

The aforementioned ultrasonic welding is performed using a general output and for a general welding time. That is, the ultrasonic welding is not performed using an extralarge power or for an extra-long welding time, but the oxide film 52c is worn using a general power and for a general welding time such that it is possible to reduce the thickness of the oxide film 52c to an appropriate thickness (10 nm or less, for example) that does not affect welding. In order to further reduce the output of the ultrasonic welding or to further shorten the welding time, it is preferable to reduce the thickness of the oxide film 52c (53c). For example, the thickness of the oxide film 52c (53c) is set to 7 nm or less (more preferably 6 nm or less) such that the output of the ultrasonic welding can be reliably reduced, or the welding time can be reliably shortened.

Then, the strip-like lead material 5 for a negative electrode is cut to a predetermined length in the longitudinal direction (a direction perpendicular to the width direction in the plate surface direction), and an end of the cut lead material 5 for a negative electrode and the negative electrode terminal (housing 1) are welded (bonded) to each other by resistance welding. In such a case, as shown in FIG. 4, the housing 1 and the lead material 5 for a negative electrode are sandwiched between a pair of terminals of a resistance welder (not shown) in a state in which the inner bottom surface 1a of the housing 1 and the surface 53b of the Ni layer 53 of the lead material 5 for a negative electrode are in contact with each other. Then, a current is applied to the housing 1 and the lead material 5 for a negative electrode such that heat is generated mainly in a surface area (contact interface) with high resistance in which the Ni layer 53 and the housing 1 are in contact with each other. Thus, the Ni layer 53 and the housing 1 are melted at the contact interface between the Ni layer 53 and the housing 1. At this time, the oxide film 53c having a thickness of 30 nm or less is sufficiently thin, and thus the occurrence of a problem that welding is not sufficiently performed due to the oxide film 53c is significantly reduced or prevented. Thus, the lead material 5 for a negative electrode and the housing 1 are welded to each other with sufficient bonding strength.

At this time, the rigidity of the lead material 5 for a negative electrode is small, and thus the lead material 5 for a negative electrode can be easily disposed in the housing 1 along the inner surface of the cylindrical housing 1. Thus, a large space can be ensured in the housing 1, and thus the capacity of the battery 100 can be increased.

Thereafter, the positive electrode 3a and the positive electrode terminal are connected to each other by the lead material 4 for a positive electrode, and an electrolyte (not shown) is injected into the housing 1. Finally, the housing 1 is sealed with the lid 2 such that the battery 100 is produced.

<Advantageous Effects of Present Embodiment>

According to the present embodiment, the following advantageous effects are achieved.

According to the present embodiment, as described above, the exposed surface 52b of the Ni layer 52 and the exposed surface 53b of the Ni layer 53 of the clad material 50 include the oxide films 52c and 53c each having a thickness of 30 nm or less (preferably 10 nm or less), respectively. Accordingly, the thicknesses t4 of the oxide films 52c and 53c are 30 nm or less, which is sufficiently small, and thus when the lead material 5 for a negative electrode is welded to the negative electrode 3b, the difficulty in direct contact of the Ni layer 52 inside the oxide film 52c of the lead material 5 for a negative electrode with the negative electrode 3b can be significantly reduced or prevented. Similarly, when the lead material 5 for a negative electrode is welded to the negative electrode terminal (housing 1), the difficulty in direct contact of the Ni layer 53 inside the oxide film 53c of the lead material 5 for a negative electrode with the housing 1 can be significantly reduced or prevented. Consequently, when the lead material 5 for a negative electrode is welded to the negative electrode 3b and the housing 1, a decrease in the bonding strength can be significantly reduced or prevented.

According to the present embodiment, the thickness t4 of the oxide film 52c is 30 nm or less, which is sufficiently small, and thus when the lead material 5 for a negative electrode is welded to the negative electrode 3b by ultrasonic welding, the oxide film wears due to friction between the lead material 5 for a negative electrode and the negative electrode 3b caused by ultrasonic vibration, and the thickness of the oxide film 52c remaining on the surface 52b can be reduced to an appropriate thickness (20 nm or less, for example, preferably 15 nm or less, more preferably 10 nm or less, still more preferably 8 nm or less, and even more preferably 6 nm or less) that does not affect welding. Accordingly, welding of the lead material 5 for a negative electrode to the negative electrode 3b in a state in which the welding is likely to be influenced by the oxide film 52c remaining on the surface 52b can be significantly reduced or prevented. Consequently, insufficient welding of the lead material 5 for a negative electrode to the negative electrode 3b can be significantly reduced or prevented, and thus a decrease in the bonding strength between the lead material 5 for a negative electrode and the negative electrode 3b can be significantly reduced or prevented.

According to the present embodiment, the Ni layers 52 and 53 are respectively bonded to the opposite surfaces of the Cu layer 51. Accordingly, when the lead material 5 for a negative electrode is connected to the negative electrode 3b and the housing 1, it is not necessary to check the front and back of the lead material 5 for a negative electrode. Thus, the handleability of the lead material 5 for a negative electrode can be improved. Furthermore, increases in the hardnesses and bending stresses of the Ni layers 52 and 53 can be significantly reduced or prevented as compared with the case in which the Ni layers bonded to the opposite surfaces of the Cu layer are formed by plating, and thus increases in the hardness and bending stress of the lead material 5 for a negative electrode can be significantly reduced or prevented.

According to the present embodiment, in the Ni layer 52, the surface 52b including the oxide film 52c having a thickness of 30 nm or less is exposed on the Z1 side not bonded to the Cu layer 51. Similarly, in the Ni layer 53, the surface 53b including the oxide film 53c having a thickness of 30 nm or less is exposed on the Z2 side not bonded to the Cu layer 51. Accordingly, the surface 52b of the Ni layer 52 including the oxide film 52c having a thickness of 30 nm or less and the surface 53b of the Ni layer 53 including the oxide film 53c having a thickness of 30 nm or less are located on both the front and back surfaces of the lead material 5 for a negative electrode, and thus the negative electrode 3b or the housing 1 can be connected to any of the front and back surfaces of the lead material 5 for a negative electrode while a decrease in the bonding strength due to welding is significantly reduced or prevented. Consequently, a surface of the lead material 5 for a negative electrode connected to the negative electrode 3b and a surface of the lead material 5 for a negative electrode connected to the housing 1 can be selected according to the positional relationship between the negative electrode 3b and the housing 1 in the battery 100. Therefore, the lead material 5 for a negative electrode can be easily connected to the negative electrode 3b and the housing 1.

According to the present embodiment, the bending stress of the clad material 50 is 550 MPa or less (preferably 500 MPa or less). Accordingly, the lead material 5 for a negative electrode can be easily bent and deformed in the battery 100, and thus the degree of freedom of arrangement of the lead material 5 for a negative electrode can be improved. Consequently, the lead material 5 for a negative electrode can be easily disposed in the battery 100. For example, after the lead material 5 for a negative electrode is disposed in the battery 100, the bending stress of the clad material 50 is preferably sufficiently larger than the bending stress (about 150 MPa) of the Cu layer (single layer) made of Cu or a Cu alloy after annealing, and specifically it is preferably about 200 MPa or more and more preferably about 300 MPa or more when an emphasis is placed on prevention of damage (durability) to the lead material 5 for a negative electrode caused by the drop or vibration of the battery 100, easy handling of the lead material 5 for a negative electrode, or the like.

According to the present embodiment, the side surfaces 51c and 51d from which the Cu layer 51 of the clad material 50 is exposed respectively include the chemical conversion films 51e and 51f that inhibit the oxidation of the Cu layer 51. Accordingly, the Cu layer 51 can be reliably and stably protected by the chemical conversion films 51e and 51f formed by the chemical reaction with the Cu layer 51, and thus progress of the oxidation of the Cu layer 51 can be reliably significantly reduced or prevented. Consequently, both formation of lithium oxide with high resistance and deposition of Cu in the form of dendrites in the battery 100 can be significantly reduced or prevented by the chemical conversion films 51e and 51f respectively formed on the side surfaces 51c and 51d.

In the manufacturing method according to the present embodiment, annealing is performed on the formed clad material 50 in a non-oxidizing atmosphere. Accordingly, the thicknesses of the oxide films 52c and 53c can be easily reduced to 30 nm or less on the exposed surface 52b of the Ni layer 52 and the exposed surface 53b of the Ni layer 53, respectively, as compared with the case in which annealing is performed in the atmosphere, which is not a non-oxidizing atmosphere. In addition, annealing is performed on the formed clad material 50 such that the stress (internal stress) of the clad material 50 can be reduced, and thus the bending stress of the lead material 5 for a negative electrode can be reduced. Thus, the lead material 5 for a negative electrode can be easily bent and deformed. Thus, the degree of freedom of arrangement of the lead material 5 for a negative electrode can be improved.

In the manufacturing method according to the present embodiment, annealing is performed in a non-oxidizing atmosphere in the annealing furnaces 202 and 205 in which the dew-point temperature is set to −20° C. or less. Accordingly, the interiors of the annealing furnaces 202 and 205 can be set such that the oxygen concentrations are sufficiently reduced, and thus the thicknesses of the oxide films 52c and 53c can be more reliably reduced to 30 nm or less.

In the manufacturing method according to the present embodiment, the clad material 50 is cut in the thickness direction, and the cut clad material 50 is annealed in a non-oxidizing atmosphere. Accordingly, the strain due to work-hardening caused by the cutting can be released, and thus the bending stress of the cut clad material 50 can be reduced. Consequently, the lead material 5 for a negative electrode cut into a predetermined size (width) can be easily bent and disposed in the battery 100, and can be welded to the negative electrode 3b and the housing 1.

In the manufacturing method according to the present embodiment, after the clad material 50 is cut in the thickness direction, the chemical conversion films 51e and 51f that inhibit the oxidation of the Cu layer 51 are respectively formed on the side surfaces 51c and 51d of the cut surfaces of the cut clad material 50 from which the Cu layer 51 is exposed. Accordingly, the chemical conversion films 51e and 51f formed by the chemical reaction with the Cu layer 51 are provided on the side surfaces 51c and 51d exposed by the cutting such that the Cu layer 51 can be reliably and stably protected, and thus progress of the oxidation of the Cu layer 51 can be reliably significantly reduced or prevented.

Example

An example conducted to confirm the effect of the present invention is now described. In this example, a clad material 50 having a three-layer structure including a Cu layer 51 and Ni layers 52 and 53 was bonded to a Cu foil as a negative electrode, and the bonding state was actually observed.

Specifically, based on the above embodiment, a plurality of (four) three-layer clad materials 50 each including a Cu layer 51 made of oxygen free copper and Ni layers 52 and 53 respectively formed on opposite surfaces of the Cu layer 51 and made of NW 2201, and including oxide films having thicknesses different from each other were produced. At this time, in a circle with a diameter of 4 mm set on a surface to be welded, the element distribution in a depth direction from the surface was examined by GD-OES analysis, and a distance (depth) from a position at which the oxygen value gradually decreased and reached 2% to the surface was taken as the thickness of the oxide film. The thicknesses of the oxide films obtained by GD-OES analysis in the four three-layer clad materials 50 were 3.2 nm, 3.9 nm, 5.7 nm, and 8.0 nm, respectively.

The thickness of each of the clad materials 50 was set to 0.1 mm, and the ratio of the thickness of the Ni layer 52, the thickness of the Cu layer 51, and the thickness of the Ni layer 53 was set to 1:2:1. In addition, each of the clad materials 50 was formed in a strip shape.

Then, the four produced clad materials 50 were respectively bonded to copper foils each made of oxygen-free copper with a thickness of 10 μm using an ultrasonic welder (MA-Xea (oscillator: 2000Xea) manufactured by BRANSON). At this time, as welding conditions, the delay time was set to 1 second, the welding time was set to 0.05 seconds, the output (amplitude) was set to 40% of the maximum output, the frequency was set to 40 kHz, and the pressure was set to 0.2 MPa. In these conditions, the output is smaller than a general output, and the welding time is shorter than a general welding time. Furthermore, the copper foils having lengths greater than the lengths of the clad materials 50 in width directions (the short-side directions of the strip-like clad materials 50) were ultrasonically welded to the clad materials 50, respectively.

Thereafter, a peeling experiment was performed. Specifically, a peeling force was applied to bonded portions between the clad materials 50 and the copper foils. When the bonded portions between the clad materials 50 and the copper foils were peeled and the copper foils did not remain on the clad materials 50, the welding strength was low, and thus it was determined to be "defective". When the bonded portions between the clad materials 50 and the copper foils were not peeled but the copper foils were broken to remain on the clad materials 50, the welding strength was high, and thus it was determined to be "good".

As results of the measurement, on the clad materials 50 including the oxide films having thicknesses of 3.2 nm, 3.9 nm, and 5.7 nm, respectively, the copper foils remained, and the welding strength was high, which was "good". On the other hand, on the clad material 50 including the oxide film having a thickness of 8.0 nm, the copper foil did not remain, and the welding strength was low, which was "defective". Consequently, it has been confirmable that as the thicknesses of the oxide films in the clad materials 50 are smaller, such as 7.0 nm or less (preferably 6.0 nm or less), the welding strength is higher. Furthermore, it has been confirmable that when the thicknesses of the oxide films in the clad materials 50 are 7.0 nm or less (preferably 6.0 nm or less), sufficient welding strength can be obtained even in the case of the output at the time of ultrasonic welding smaller than a general output and the welding time at the time of ultrasonic welding shorter than a general welding time, and thus efficient production of the battery 100 can be easily achieved.

In addition, using the clad material 50 including the oxide film with a thickness of 8.0 nm, which was "defective", welding was performed while the output was increased to 50% of the maximum output without changing the remaining welding conditions. When the peeling experiment similar to the above was performed, the copper foil remained on the clad material 50, and the welding strength was high, which was "good". From this, it has been confirmable that the output of the ultrasonic welder is increased such that the welding strength can be improved. When welding is performed while the output is increased to 100% without changing the welding time, for example, a certain degree of welding strength can conceivably be ensured even in the case of the oxide film with a thickness of about 15 nm. Furthermore, when the welding time is further increased to substantially the same level as a general welding condition while the output is increased, a certain degree of welding strength can conceivably be ensured even in the case of the oxide film with a thickness of 30 nm or a value less than 30 nm and in the vicinity of 30 nm.

Moreover, it is not restricted to ultrasonic welding in which bonding (solid phase bonding) is performed without melting a clad material and a copper foil like the aforementioned Example. Also in resistance welding and laser welding in which a clad material and a copper foil are melted and bonded (liquid phase bonded) to each other, sufficient weld strength can be obtained in the case of an oxide film with a thickness of 30.0 nm or less (preferably 20 nm or less, more preferably 15 nm or less, still more preferably 10 nm or less, even more preferably 8 nm or less, and further more preferably 6 nm or less) even when the output at the time of ultrasonic welding is smaller than a general output, and the welding time at the time of ultrasonic welding is shorter than a general welding time.

Thus, efficient production of the battery 100 can conceivably be easily achieved.

Modified Examples

The embodiment disclosed this time must be considered as illustrative in all points and not restrictive. The scope of the present invention is not shown by the above description of the embodiment but by the scope of claims for patent, and all modifications (modified examples) within the meaning and range equivalent to the scope of claims for patent are further included.

For example, while the example in which the lead material 5 for a negative electrode is used in a cylindrical lithium-ion battery (battery 100) has been shown in the aforementioned embodiment, the present invention is not restricted to this. According to the present invention, the lead material for a negative electrode may be used in a battery other than a lithium-ion battery. Alternatively, the lead material for a negative electrode may be used in a laminated battery, for example, instead of a cylindrical battery.

While the example in which the annealing (diffusion annealing) step is performed on the formed clad material 50 in a non-oxidizing atmosphere such that in the lead material 5 for a negative electrode, the exposed surface 52b of the Ni layer 52 and the exposed surface 53b of the Ni layer 53 respectively include the oxide films 52c and 53c each having a thickness of 30 nm or less has been shown in the aforementioned embodiment, the present invention is not restricted to this. According to the present invention, the lead material for a negative electrode may include the exposed surface of the Ni layer including the oxide film with a thickness of 30 nm or less by a method other than the annealing (diffusion annealing) step in a non-oxidizing atmosphere.

For example, after an annealing step is performed on the formed clad material in the atmosphere, a thermal oxide film with a large thickness formed on the exposed surface of the Ni layer may be completely or partially removed by polishing and etching, for example, such that the lead material for a negative electrode includes the exposed surface of the Ni layer including the oxide film with a thickness of 30 nm or less. When the thermal oxide film is completely removed by polishing and etching, for example, the exposed surface of the Ni layer includes the oxide film with a thickness of 30 nm or less, which is naturally formed in contact with the atmosphere. When the thermal oxide film is partially removed by polishing and etching, for example, the exposed surface of the Ni layer includes the oxide film with a thickness of 30 nm or less in a state in which the thermal oxide film that has not been removed and the oxide film naturally formed by contact of the surface of the Ni layer exposed by removal of the thermal oxide film with the atmosphere are mixed.

Alternatively, after an anodizing step is performed on the formed clad material, an anode oxide film with a large thickness formed on the exposed surface of the Ni layer may be completely or partially removed by polishing and etching, for example, such that the lead material for a negative electrode includes the exposed surface of the Ni layer including the oxide film with a thickness of 30 nm or less. When the anode oxide film is completely removed by polishing and etching, for example, the exposed surface of the Ni layer comes into contact with the atmosphere and includes the oxide film, the thickness of which does not exceed 30 nm. When the anode oxide film is partially removed by polishing and etching, for example, the exposed surface of the Ni layer includes the oxide film in a state in which the anode oxide film that has not been removed and the oxide film naturally formed by contact of the surface of the Ni layer exposed by removal of the anode oxide film with the atmosphere are mixed. The thickness of the oxide film does not exceed 30 nm.

While the example in which the Cu layer 51 is made of a metal material mainly containing Cu, which contains 99.0 mass % or more of Cu has been shown in the aforementioned embodiment, the present invention is not restricted to this. According to the present invention, the Cu layer may be made of a Cu alloy containing about 95 mass % or more of Cu. For example, the Cu layer may be made of a Cu—Fe—Zn—P alloy (C194, C19400 in the CNS standards).

While the example in which the pair of Ni layers 52 and 53 are each made of a metal material mainly containing Ni, which contains 99.0 mass % or more of Ni has been shown in the aforementioned embodiment, the present invention is not restricted to this. According to the present invention, the Ni layers respectively bonded to the opposite surfaces of the Cu layer may be each made of a Ni alloy containing about 90 mass % or more of Ni. For example, the Ni layers respectively bonded to the opposite surfaces of the Cu layer may be made of a Ni—Cu alloy in No. NW4400s defined in the JIS standards, for example.

While a nitrogen gas is introduced into the furnace main bodies 202b and 205b of the annealing furnaces 202 and 205 such that the interiors of the furnace main bodies 202b and 205b are set to a non-oxidizing atmosphere in the manufacturing method according to the aforementioned embodiment, the present invention is not restricted to this. According to the present invention, for example, using a hydrogen gas, a mixed gas of hydrogen and nitrogen, or an inert gas such as an argon gas instead of a nitrogen gas, the interiors of the furnace main bodies of the annealing furnaces may be set to a non-oxidizing atmosphere. Furthermore, the dew-point temperature, the internal furnace temperature (about 800° C.), and the holding time (1 minute) shown in the manufacturing method according to the aforementioned embodiment are just examples, and may be changed. For example, the dew-point temperature may be greater than −20° C., but it needs to be at least below an atmospheric dew-point temperature. Furthermore, it may be determined whether or not the interiors of the furnace main bodies of the annealing furnaces are in a non-oxidizing atmosphere based on parameters other than the dew-point temperature. For example, the oxygen concentrations in the furnace main bodies of the annealing furnaces may be directly measured such that it is determined whether or not the interiors of the furnace main bodies of the annealing furnaces are in a non-oxidizing atmosphere.

In the manufacturing method according to the aforementioned embodiment, the roll-bonding step, the diffusion annealing step, the rolling step, and the annealing step are continuously performed. Furthermore, while the cutting step, the annealing step, and the rust prevention step are continuously performed in the aforementioned embodiment, the present invention is not restricted to this. According to the present invention, all of the roll-bonding step, the diffusion annealing step, the rolling step, the annealing step, the cutting step, the annealing step, and the rust prevention step may be continuously performed. Alternatively, each of the roll-bonding step, the diffusion annealing step, the rolling step, the annealing step, the cutting step, the annealing step, and the rust prevention step may be individually performed, or only some steps may be continuously performed.

While at the time of producing the clad material 50, the diffusion annealing step and the annealing step are performed in a non-oxidizing atmosphere in the manufacturing method according to the aforementioned embodiment, the present invention is not restricted to this. According to the present invention, at the time of producing the clad material, the diffusion annealing step and the annealing step may be performed in the atmosphere, for example, instead of the non-oxidizing atmosphere. At this time, after the oxide film with a large thickness formed on the exposed surface of the Ni layer is completely or partially removed by polishing and etching, for example, the cutting step may be performed, and the annealing step may be finally performed in a non-oxidizing atmosphere.

While the rust prevention step is performed on the strip-like clad material 50 in the manufacturing method according to the aforementioned embodiment, the present invention is not restricted to this. According to the present invention, after the strip-like clad material is cut to a predetermined length in the longitudinal direction, the rust prevention step may be performed. Thus, it is possible to cover the Cu exposed surfaces of the Cu layer at opposite ends in the longitudinal direction as well as in the width direction of the lead material for a negative electrode with chemical conversion films. Alternatively, the rust prevention step may not be performed on the clad material. That is, the Cu exposed surfaces of the Cu layer exposed on opposite side surfaces of the lead material for a negative electrode may not be covered with chemical conversion films.

While the strip-like clad material 50 is produced, and the produced clad material 50 is cut to produce the lead material 5 for a negative electrode in the manufacturing method according to the aforementioned embodiment, the present invention is not restricted to this. According to the present invention, the clad material may be produced with the width of the lead material for a negative electrode in advance such that the lead material for a negative electrode is produced only by the method of manufacturing the clad material (the roll-bonding step, the diffusion annealing step, the rolling step, and the annealing step). Thus, the cutting step of cutting the clad material 50, etc. are not necessary. In such a case, the annealing step is performed on the bonded Cu plate and pair of Ni plates in a non-oxidizing atmosphere such that it is possible to produce the lead material for a negative electrode in which the exposed surfaces of the Ni layers each include the oxide film with a thickness of 30 nm or less.

While the example in which the Ni layer 52 on one side of the lead material 5 for a negative electrode is welded to the negative electrode 3b, and the Ni layer 53 on the other side of the lead material 5 for a negative electrode is welded to the negative electrode terminal (housing 1) has been shown in the aforementioned embodiment, the present invention is not restricted to this. According to the present invention, both the negative electrode and the negative electrode terminal may be welded to the Ni layer on one side (or the other side) of the lead material 5 for a negative electrode. A method for welding the lead material for a negative electrode to the negative electrode or the negative electrode terminal is not restricted to ultrasonic welding or resistance welding, but may be laser welding, for example.

DESCRIPTION OF REFERENCE NUMERALS

5: lead material for negative electrode
50: clad material
50a, 50b: side surface (end surface)
51: Cu layer
51c, 51d: side surface (surface to which the Ni layers are not bonded)
51e, 51f: chemical conversion film
52, 53: Ni layer
52b, 53b: surface (surface not bonded to the Cu layer)
52c, 53c: oxide film
151: Cu plate
152, 153: Ni plate
202, 205: annealing furnace

The invention claimed is:

1. A lead material (5) for a negative electrode, made of a clad material (50) comprising a Cu layer (51) made of Cu or a Cu alloy and Ni layers (52, 53) each made of Ni or a Ni alloy, wherein
    the Ni layers are respectively bonded to opposite surfaces of the Cu layer; and
    the Ni layers each include a surface (52b, 53b) not bonded to the Cu layer, the surface including an oxide film with a thickness of 30 nm or less.

2. The lead material for a negative electrode according to claim 1, wherein the surface of each of the Ni layers not bonded to the Cu layer includes the oxide film with a thickness of 10 nm or less.

3. The lead material for a negative electrode according to claim 1, wherein the clad material has a bending stress of 500 MPa or less.

4. The lead material for a negative electrode according to claim 1, wherein the Cu layer includes a surface (51c, 51d) to which the Ni layers are not bonded, the surface including a chemical conversion film (51e, 51f) that inhibits oxidation of the Cu layer.

5. A method for manufacturing a lead material (5) for a negative electrode, comprising:
    preparing a clad material (50) in which Ni layers (52, 53) each made of Ni or a Ni alloy are respectively bonded to opposite surfaces of a Cu layer (51) made of Cu or a Cu alloy by performing roll-bonding in a state in which Ni plates (152, 153) each made of the Ni or the Ni alloy are disposed on opposite surfaces of a Cu plate (151) made of the Cu or the Cu alloy; and
    performing annealing in a non-oxidizing atmosphere on the clad material that has been prepared.

6. The method for manufacturing a lead material for a negative electrode according to claim 5, wherein the annealing is performed in the non-oxidizing atmosphere in an annealing furnace (202, 205) in which a dew-point temperature is set to −20° C. or less.

7. The method for manufacturing a lead material for a negative electrode according to claim 5, wherein
  the clad material is cut in a thickness direction; and
  the annealing is performed in the non-oxidizing atmosphere on the clad material that has been cut.

8. The method for manufacturing a lead material for a negative electrode according to claim 5, further comprising forming chemical conversion films (51*e*, 51*f*) that inhibit oxidation of the Cu layer on opposite end surfaces of the clad material in a width direction after the annealing.

\* \* \* \* \*